C. F. PARKER.
SELF ACTING AND SELF REGULATING BRAKE MECHANISM.
APPLICATION FILED MAR. 21, 1914.
1,111,089.
Patented Sept. 22, 1914.
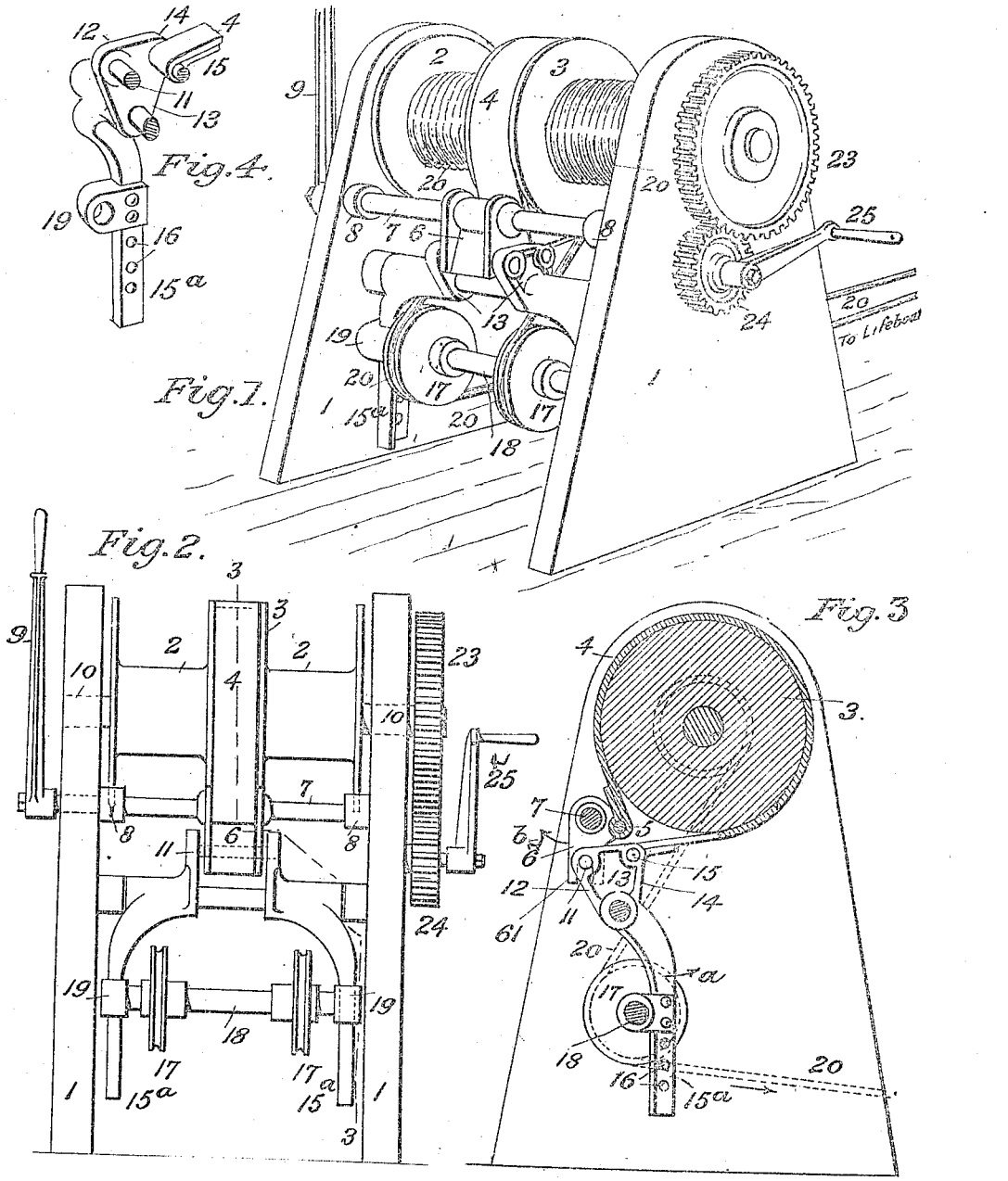
WITNESSES:
John T. Schrott
Charles Diller
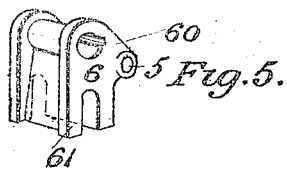
INVENTOR
C. F. Parker
BY
Fred G. Dieterich
ATTORNEYS.

UNITED STATES PATENT OFFICE.

CLYDE F. PARKER, OF PORTLAND, OREGON.

SELF-ACTING AND SELF-REGULATING BRAKE MECHANISM.

1,111,089.  Specification of Letters Patent.  Patented Sept. 22, 1914.

Application filed March 21, 1914. Serial No. 826,240.

*To all whom it may concern:*

Be it known that I, CLYDE F. PARKER, residing at Portland, in the county of Multnomah and State of Oregon, have invented a new and Improved Self-Acting and Self-Regulating Brake Mechanism, of which the following is a specification.

My invention, which in its general nature, relates to improvements in band brake devices, is more particularly designed for providing an improved brake mechanism that forms a part of a hoisting and lowering means and to be used for general purposes, and more particularly for providing safety in the lowering of life boats from vessels at sea.

The primary object of my invention is to provide a simple and inexpensive means, including a peculiarly arranged brake mechanism, that can be under absolute control of one person stationed at the "winch" at a distance from the same or in the boat, the lowering of which is controlled by the said means. In the lowering of life boats, the great danger encountered, when lowering them under unfavorable conditions, has been the inability of two men to lower the boat evenly into the water, they being usually unable to lower the boat rapidly at the proper moment, often by reason of the lowering lines or falls getting fouled.

One of the purposes of my invention is to provide a means especially adapted for lowering life boats in which special provision is made for keeping the lines or falls clear and free to run at all times, and in which the brake devices are so constructed that the greater the strain on the falls, the tighter the brake band is held applied.
With other objects in view that will hereinafter appear, my invention comprises a brake mechanism that embodies the peculiar features of construction and novel arrangement of the parts hereinafter fully explained, specifically pointed out in the appended claims and illustrated in the accompanying drawing, in which:

Figure 1 is a perspective view of my invention. Fig. 2 is a side elevation thereof.
Fig. 3 is a vertical cross section of the same on the line 3—3 on Fig. 2. Fig. 4 is a detail perspective view of the knuckle lever hereinafter referred to. Fig. 5 is a detail view of the hand controlled or brake releasing knuckle lever.

In the practical arrangement of my invention, and in its simplest form, the same embodies a main or supporting frame which includes the opposite side members 1—1, the upper ends of which have journal bearings 10 for the journals of double drum 2 formed with a central annular brake band receiving flange 3, around which takes the brake band 4, one end of which, through the medium of the cross pin 5, connects with one end 60 of a knuckle or bell crank lever 6 fixedly mounted on a cross shaft 7 journaled in bearings 8—8 on the side frame members 1, one end being extended and provided with a hand lever 9.

One end 61 of the bell crank lever 6 is bifurcated and straddles a cross pin 11 mounted in one arm 12 of another bell crank or knuckle lever 13, the other arm 14 of which carries a cross pin 15, to which the other end of the brake band is connected as is best shown in Fig. 4, by reference to which it will be also noticed the knuckle lever is formed of two opposing sections each of which terminates in an outwardly and downwardly carried lever arm 15ª, and the said arms each have a series of vertically alined apertures 16, the purpose of which will presently appear. Coöperating with the two drum sections, is a pair of sheaves 17—17 mounted on a single cross shaft 18 journaled in bearing brackets 19 adjustably mounted on the pendent arms or levers 15ª.

20—20 designate a pair of cables or "falls," one for each drum section, one end of each of which is made fast to its respective drum section and passes from the drum back over its respective sheave 17 from whence it passes out to connect with the object to be raised and lowered, it being understood that when utilized for raising and lowering boats, the falls or cables are passed over suitable guides, separated, and made fast to the boat in the manner in which the falls are usually connected to the said boats. One end of the double drum shaft carries a hoisting gear 23 that meshes with a pinion 24 with which the hoisting crank 25 connects.

By reason of the peculiar construction and novel arrangement of the parts, as shown and described, it will be readily apparent the cables or falls will remain clear and free to run at all times. Furthermore, so soon as strain is applied to the falls or cables, as in lowering a boat, my device becomes a self-braking one, since the pull strain on the falls (see arrow) causes the lever arms 15ª to rock in the direction indicated by the arrow *a*, which pulls taut that end of the band attached to knuckle lever 14, and simultaneously, by rocking the other knuckle or bell crank lever, in the direction of the arrow *b*, pulls the corresponding end of the band taut, it being obvious that the greater the pull on the falls, the tighter the brake band is set up, which band can only be released to allow the drum and the falls to further run free by shifting the hand lever, which may be done by a person adjacent the winch or drum, by a person some distance away, by means of a rope connection or by an occupant of the boat being lowered by a rope connection, it being understood that so soon as the pull strain on the hand lever is released the locking of the brake band is again instantly set up, by the automatic shifting action of the knuckle levers.

By reason of coöperatively arranging the several parts, as shown and described, a self-braking action is set up immediately there is a pull strain on the falls and the outfeed of the falls caused to cease until the knuckle levers that apply the brake are shifted to free the brake band, it being obvious that the extent of time that the band is held free is determined by the hand lever control.

What I claim is:

1. In a brake mechanism, a brake drum, a brake band around the drum, a knuckle lever device connecting the ends of the brake band, and a separate operating member connected one with each of two of the elements of the knuckle lever device.

2. In a brake mechanism for cable carrying drums, the combination with the cable drum having a brake surface; of a brake band taking around the said surface, a knuckle lever device connecting the ends of the brake band, and an operative connection between the said cable and one of the elements of the knuckle lever device for tightening the brake band according to the tension on the cable.

3. In a brake mechanism for cable carrying drums, the combination with the cable drum having a brake surface; of a brake band taking around the said surface, a knuckle lever device connecting the ends of the brake band, an operative connection between the said cable and one of the elements of the knuckle lever device for tightening the brake band according to the tension on the cable, and a separate controlling member connected with the knuckle lever device for actuating the brake band independently of the aforementioned operative connection.

4. In a brake mechanism of the character stated; a cable carrying drum, said drum including an annular brake flange, a device comprising a pair of interengaging bell crank levers, a brake band that takes around the drum flange, the ends of which separately join with the two bell crank levers, a cable guide on one of the bell crank levers around which takes the cable as it passes from the drum, said device operating to apply the brake band when tension is on the cable, and manually operated means for shifting the device to overcome the tension on the cable to release the drum.

5. In a brake mechanism of the character stated, a hoisting drum having a central annular brake band receiving flange, a separate cable connected to each end of the drum, a device consisting of a pair of bell crank levers, one of which has pendent forked extensions, a brake band around the drum flange, one end of which connects to one bell crank lever, and the other end to the other bell crank lever, one of the bell crank levers including a forked member that interengages with one element of the other bell crank lever, cable sheaves mounted on the aforesaid pendent forked extensions, over which the cables from the drum pass and which form the pulling element for shifting the said devices to apply the brake band when tension is on the cables, and a hand lever connected with the bell crank lever having the forked member for rocking the said crank lever to shift the said devices to release the brake.

CLYDE F. PARKER.

Witnesses:
J. A. STROWBRIDGE,
EDNA J. MURPHY.